June 19, 1962 E. B. CLOSE ET AL 3,039,202

RECORD HOLDER AND VIEWER

Filed March 11, 1959 2 Sheets-Sheet 1

INVENTORS:
EGBERT B. CLOSE
JOSEPH A. PATENAUDE

BY Howson & Howson

ATTYS.

RECORD HOLDER AND VIEWER

Filed March 11, 1959 2 Sheets-Sheet 2

INVENTORS:
EGBERT B. CLOSE
JOSEPH A. PATENAUDE
BY Howson & Howson
ATTYS.

United States Patent Office 3,039,202

Patented June 19, 1962

3,039,202

RECORD HOLDER AND VIEWER

Egbert B. Close, Philadelphia, and Joseph A. Patenaude, Devon, Pa., assignors to C & P Phonoproducts, Incorporated, Philadelphia, Pa., a corporation of Pennsylvania Filed Mar. 11, 1959, Ser. No. 798,734
1 Claim. (Cl. 35—8)

The present invention relates to new and useful improvements in combination visual and audio promotional and educational devices and more particularly to new and useful improvements in viewers for use in conjunction with a phonograph record whereby a series of illustrations may be selectively viewed during play of the record to illustrate items, a story, or a set of instructions referred to on the record.

A principal object of the present invention is to provide a novel record holder and viewer which may be used to illustrate portions of a record being played.

Another object of the present invention is to provide a novel record holder and viewer housing an illustrated strip film therein adapted to present a series of illustrations one at a time through openings in the viewer.

A further object of the present invention is to provide a novel record holder and viewer of the above mentioned type wherein an illustrated film may be actuated in response to signals given by a record to supplement a story or the like told by the record.

A still further object of the present invention is to provide a novel record holder and viewer having the features and characteristics as set forth above, which is of relatively simplified construction, and may be manufactured easily and cheaply.

These and other objects of the present invention and the various features and details of the operation and use thereof are hereinafter more fully set forth and described with reference to the accompanying drawings, in which.

Figures 1, 2, 3, 7:
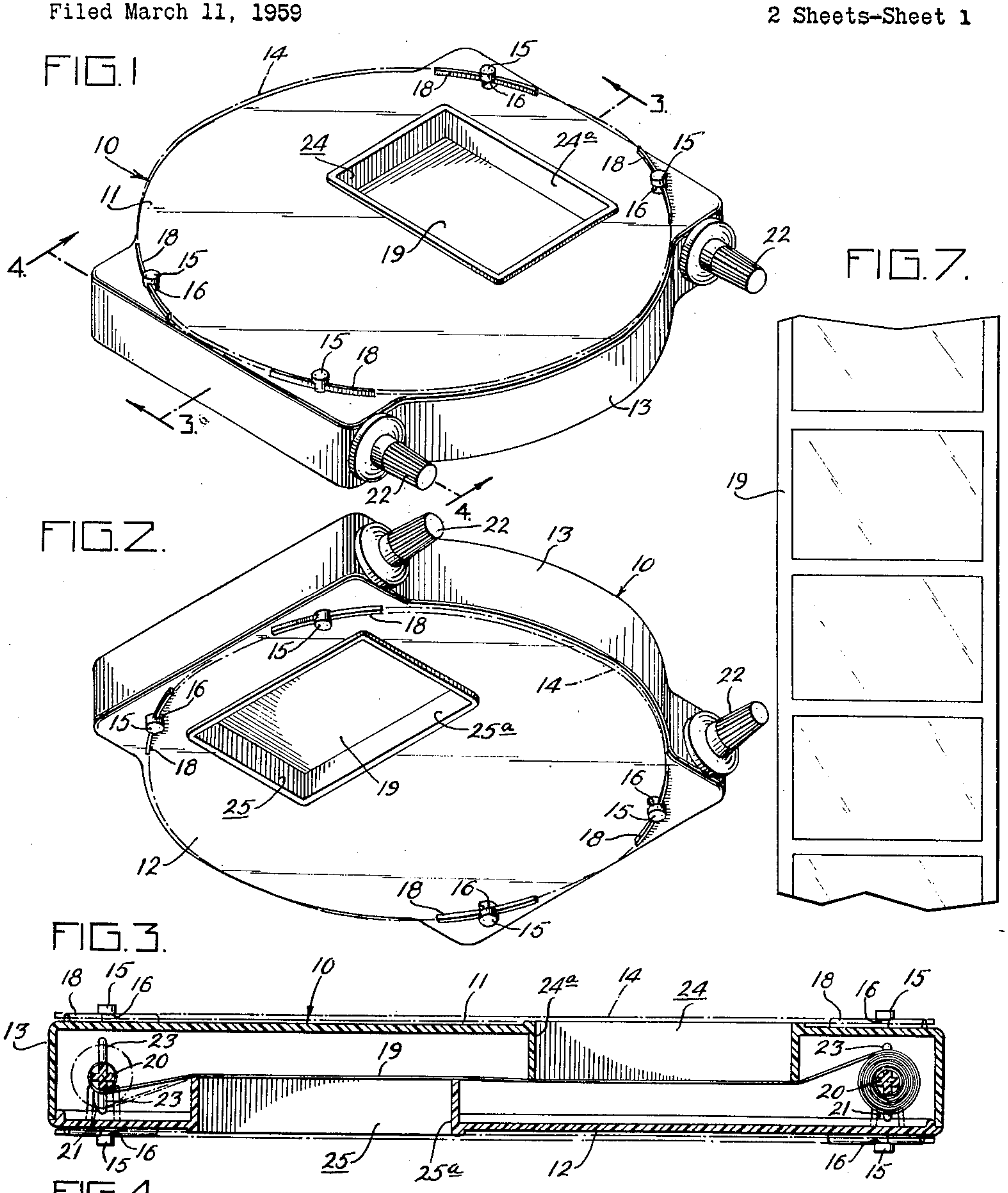
FIG. 1 is a front perspective view of one form of a record holder and viewer of the present invention.
FIG. 2 is a rear perspective view of the apparatus of FIG. 1.
FIG. 3 is an enlarged longitudinal sectional view taken on line 3—3 of FIG. 1.
FIG. 7 is a fragmentary plan view of a strip film adapted to be viewed in the viewer of the present invention.

Referring more specifically to the drawings and particularly the embodiment illustrated in FIGS. 1 to 7, inclusive, reference numeral 10 designates generally a record holder and viewer made in accordance with the present invention which comprises a housing formed by generally similar parallel front and rear panels 11 and 12, respectively, and a side wall 13 extending completely about the periphery of the front and rear panels. The front panel 11 and the side wall 13 may be formed integrally and the rear panel 12 may be secured to the side wall after assembly of the apparatus.

The front and rear panels are adapted to detachably receive and support a conventional disc type record 14 or the like as shown by broken lines in FIGS. 1 to 4. To this end a plurality of retaining members are provided on the front and rear panels disposed on the circumference of a circle, the center of which may pass through substantially the midpoint of the panels and through the center of the record 14. The retaining members are in the form of posts 15, 15 extending outwardly from the panels and having notched recesses 16, 16 adjacent the surface of the panels which engage the outer periphery of the record. Arcuate guide members may also be provided to assist in positioning the disc on the panel. These guide members may comprise rib-like projections 18, 18 extending outwardly from opposite sides of the post members 15, 15 and formed integrally with the front and rear panels. With this construction, a pliable disc type record 14 having a diameter substantially equal to the diameter of the circle defined by the posts 15, 15 may be positioned on the panels within the area defined by the arcuate guide members and retained thereon by engagement of the outer peripheral edge of the disc type record 14 in the notched recesses 16, 16 of the posts.

Figure 4:
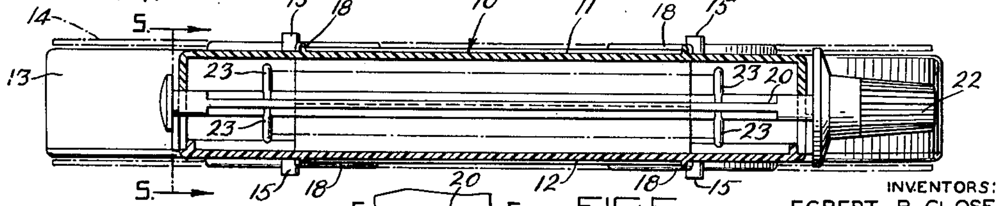
FIG. 4 is an enlarged transverse sectional view taken on line 4—4 of FIG. 1.
Figure 5:
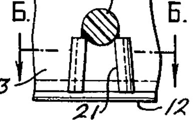
FIG. 5 is an enlarged fragmentary sectional view taken on line 5—5 of FIG. 4.
Figure 6:
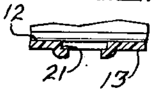
FIG. 6 is a fragmentary sectional view taken on line 6—6 of FIG. 5.
Figures 8, 9:
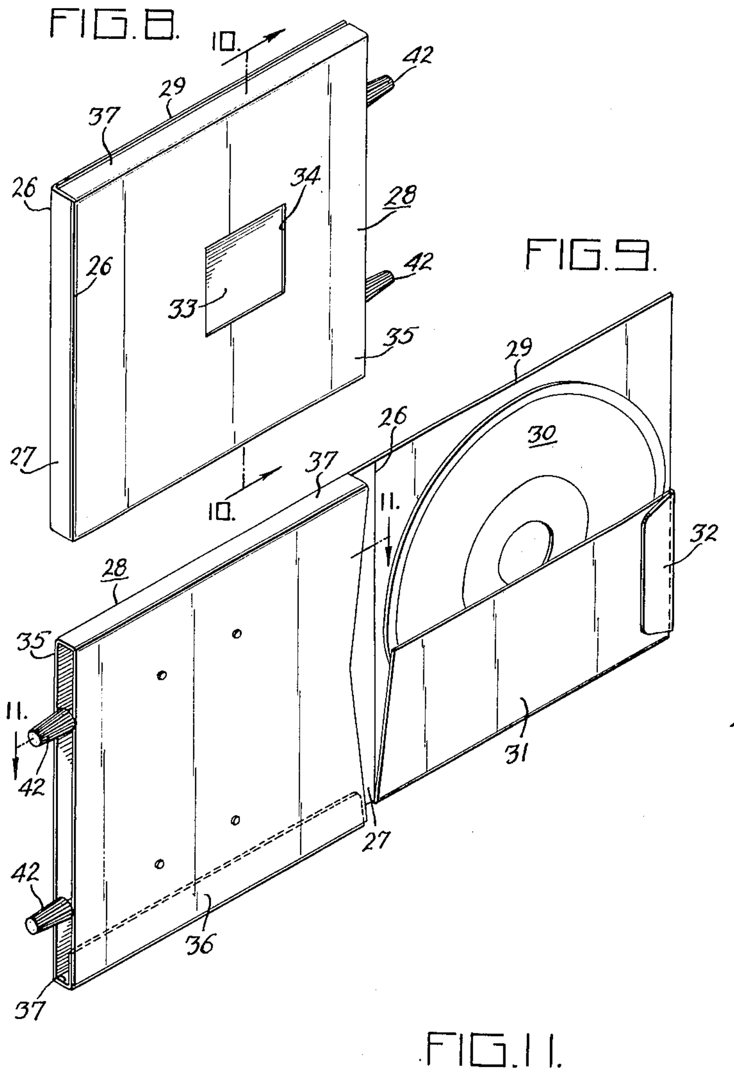
FIG. 8 is a perspective view of another embodiment of a record holder and viewer of the present invention.
FIG. 9 is a perspective view of the record holder and viewer of FIG. 8 in an open position.
Figure 10:
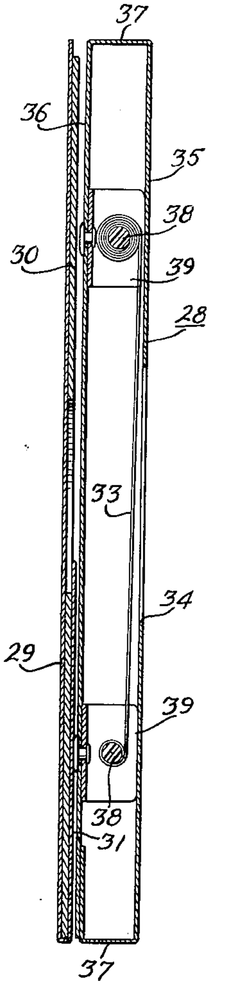
FIG. 10 is an enlarged sectional view taken on line 10—10 of FIG. 8.

In accordance with the present invention a series of illustrations in strip film form are provided which may be viewed successively through an opening in the housing. The strip film 19 is mounted in the housing for longitudinal movement so that one illustration at a time may be viewed by the user during playing of the record and the user may advance the illustration as desired preferably in response to a signal given by the record. To accomplish this, mounting means are provided within the housing 10 to mount the strip for longitudinal movement. In the illustrated embodiment of the present invention the mounting means comprise a pair of take-up spools 20, 20 rotatably journalled in spaced apart parallel relation in slotted openings 21, 21 formed in the side wall of the housing at opposite ends thereof. The roll of strip film 19 is wrapped about and extends between both take-up spools 20, 20 so that upon rotation of either spool, the film will be caused to move longitudinally within the housing. The spools are provided with knobs 22, 22 at their outer ends to facilitate manual actuation of the film while viewing the illustrations. Additionally, the strip film is centered with respect to the spools by means of radially projecting centering pins 23, 23 extending outwardly from spools adjacent opposite edges of the film as illustrated in FIG. 4.

In the embodiment shown in FIGS. 1 to 6, inclusive, generally rectangular viewing openings 24 and 25 are provided in the front and rear panels, respectively, through which the illustrations on the strip film may be viewed. The openings 24 and 25 are staggered or offset with respect to each other with one opening being offset toward one end of the housing and the other opening being offset toward the other end of the housing. The openings are provided with peripheral wall portions **24*a* and 25*a*, respectively, which extend inwardly of the housing, each of the walls projecting inwardly toward one another preferably past the midpoint of the housing. Accordingly, when the film is drawn over the openings, the walls 24*a* and 25*a*** serve as guide members insuring that the portions of the film overlying the viewing openings are maintained in a parallel relationship to the front and rear panels.

In the operation of the apparatus of the present invention, the record is played and the film is positioned with respect to the opening in the front panel so that the first frame of the series of illustrations may be viewed by the user. Upon a signal given by the record which may be a sharp click or a musical note or the like, the frame is changed by manually rotating the drive take-up spool to present the next frame of the series of illustrations to the opening in the front panel. This procedure is repeated during playing of the record until all of the illustrations on one side of the film have been viewed. The housing is then reversed to present the opening in the rear panel to the viewer. The other take-up spool is then rotated and the illustrations viewed in the manner outlined above during continued playing of the record. In this manner when the last illustration of the series has been viewed, the film has been turned back to the initial position and is set for re-viewing.

Another embodiment of the record holder and viewing apparatus in accordance with the present invention is illustrated in FIGS. 8 to 11. The apparatus comprises a folder formed of a continuous sheet of stiff paper board or the like, which has fold lines 26, 26 extending transversely thereof defining a spine 27 which divides the folder into front and rear panels 28 and 29, respectively. The front and rear panels are of generally rectangular configuration and of equal size and shape, and may be folded inwardly toward one another on the fold lines to form a generally book-like folder.

The folder is adapted to receive and support a conventional disc type record 30 or the like. To this end the rear panel has a pocket to receive the record. The pocket may be formed by folding a flap 31 integrally connected to the bottom portion of the rear panel upwardly and securing the outermost edge of the flap 31 to the outer side edge of the rear panel 29, for example, by means of a glue flap 32 or the like.

Figure 11:
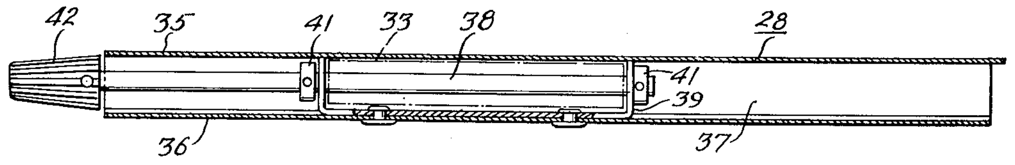
FIG. 11 is an enlarged sectional view taken on line 11—11 of FIG. 9.

In accordance with the embodiment of the present invention shown in FIGS. 8 to 11, a series of illustrations in the form of a strip film 33 are provided which may be viewed successively through an opening 34 in the front panel 28. The strip film is mounted adjacent the front panel so that one illustration at a time may be viewed by the user during playing of the record and the user may advance the illustrations as desired preferably in response to a signal given by the record. To this end the front panel is arranged to provide spaced front and rear walls 35 and 36, respectively, connected at their upper and lower ends by side walls 37, 37 with the strip film movably mounted intermediate the front and rear walls 35 and 36. A pair of take-up spools 38, 38 are rotatably mounted in spaced parallel relation on either side of the viewing opening 34 and are adapted to carry the strip film therebetween so that upon rotation of either spool the strip film moves longitudinally with respect to the opening. The spools may be mounted on brackets 39 secured to the rear wall of the front panel by suitable fasteners as illustrated in FIG. 11. The spools are rotatably journaled in openings in the brackets and are precluded from longitudinal movement of the brackets by means of retaining members 41, 41 secured to the spools as shown in FIG. 11. The spools are provided at their outer ends with knobs 42 to facilitate manual rotation of the spools. The brackets serve to properly mount the spools so that the frames of the strip film are in alignment with the opening in the front wall.

The various outer surfaces of the folder may have printed or descriptive material thereon describing or illustrating the subject of the record and may also contain instructions as to how to use the apparatus of the present invention.

In order to use the apparatus just illustrated, the record is played and the film of illustrations is positioned so that the first frame of the series of illustrations may be viewed through the opening in the front wall. Upon a given signal by the record the next illustration on the roll is presented to the opening in the folder by manually dialing the knob. This procedure is repeated upon each succeeding signal and movement of the knob until the entire roll of illustrations has been viewed. After the film is viewed the film is rewound so that the apparatus is ready for re-use.

From the foregoing, it will be apparent that the present invention provides a novel record holder and viewing device whereby a series of illustrations may be selectively viewed during playing of a record to illustrate various items such as a sales talk, a story, or a set of instructions. In addition, it will be apparent that the present invention provides a novel record holder and viewing apparatus which is of relatively simplified construction and which has an illustrated film strip therein operable to be mounted in response to signals given by a record to supplement a story or the like told by the record.

While particular embodiments of the present invention have been illustrated and described herein, it is not intended to limit the invention to such a disclosure and changes and modifications may be incorporated and embodied therein within the scope of the following claims.

We claim:

A record holder and viewer for illustrating selected portions of a story, or the like, recorded on a record having means thereon to give an audible signal at predetermined intervals comprising a pair of spaced parallel front and rear panel members, a side wall surrounding the panel members to thereby form an enclosed housing, a plurality of notched post members circumferentially spaced apart on the face of the panel members adapted to receive and maintain a disc type record by engagement of the outer periphery of said disc in the notched posts, means defining an opening in each of said panel members, a pair of spools rotatably mounted in the side wall of said housing adjacent opposite ends of said front and rear panels, a strip film composed of a series of individual frames on both sides thereof adapted to be wound from one spool to the other to thereby present the individual frames on one side of the strip through the opening in one panel and to present the individual frames on the other side of the strip through the opening in the other panel, means for mounting the strip film with respect to the openings so that the individual frames may be viewed in their entirety through the openings and means for maintaining the strip film in a parallel relation with respect to the front and rear panels, each of said illustrations being related with a portion of the recording on the record following the audible signal given by the record, whereby the strip film may be actuated, in response to the audible signals given by the record, to present illustrations illustrating the portions of the story, or the like, being transcribed by the record.

References Cited in the file of this patent

UNITED STATES PATENTS

| | | |
|---|---|---|
| 1,048,379 | Warren | Dec. 24, 1912 |
| 1,435,660 | Rogerson | Nov. 14, 1922 |
| 1,891,738 | Thomas | Dec. 20, 1932 |
| 2,029,750 | Young | Feb. 4, 1936 |
| 2,038,022 | Zubli | Apr. 21, 1936 |

FOREIGN PATENTS

| | | |
|---|---|---|
| 601,043 | France | Nov. 23, 1925 |
| 341,146 | Great Britain | Jan. 15, 1931 |